(12) United States Patent
Garfinkel

(10) Patent No.: US 6,744,864 B1
(45) Date of Patent: Jun. 1, 2004

(54) ADAPTIVE DIALING SYSTEM AND METHOD

(75) Inventor: Simson L. Garfinkel, Cambridge, MA (US)

(73) Assignee: Sandstorm Enterprises, Inc., Malden, MA (US)

( * ) Notice: Subject to any disclaimer, the term of this patent is extended or adjusted under 35 U.S.C. 154(b) by 0 days.

(21) Appl. No.: 09/574,190

(22) Filed: May 18, 2000

Related U.S. Application Data (60) Provisional application No. 60/134,641, filed on May 18, 1999.

(51) Int. Cl.[7] ............................................. H04M 11/00
(52) U.S. Cl. .............................. 379/100.01; 379/265.09
(58) Field of Search ........................... 379/93.09, 93.11, 379/100.01, 265.09, 265.11, 266.02, 266.07, 902

(56) References Cited

U.S. PATENT DOCUMENTS

| | | | | |
|---|---|---|---|---|
| 4,809,272 A | * | 2/1989 | Torgrim et al. | 370/522 |
| 4,850,008 A | * | 7/1989 | Berg et al. | 379/93.11 |
| 5,056,132 A | * | 10/1991 | Coleman et al. | 379/93.11 |
| 5,991,394 A | * | 11/1999 | Dezonno et al. | 379/265.09 |

OTHER PUBLICATIONS

"Rockewell Reference Manual—AT Commands for RCV56ACX Modems, Section 7.2.1".

* cited by examiner

Primary Examiner—Ahmad F. Matar
Assistant Examiner—Quynh H. Nguyen
(74) Attorney, Agent, or Firm—Stuart Rudoler (57) ABSTRACT

In accordance with an adaptive dialing method, a dialer control module controls a modem to place a telephone call to a telephone line and efficiently classify the telephone line, that is, to determine whether a device connected to the telephone line is one or more of a plurality of types of devices, illustratively, a voice telephone, a fax machine or modem, or a data modem. In accordance with the method, the dialer control module can enable the modem to, in one call, determine whether the telephone line is connected to a voice telephone, on the one hand, or a fax machine or modem or a data modem, on the other hand. During the same call if the dialer control module does not determine that the telephone line is connected to a voice telephone, or during a subsequent call if the dialer control module determines that the telephone line is connected to a voice telephone, the dialer control module determines whether the telephone line is also connected to one of a fax machine or modem, on the one hand, or a data modem, on the other hand by enabling the modem to transmit an appropriate tone thereto and determining whether a connection is completed in response. The dialer control module can repeated the last operation using the appropriate tone to determine whether the telephone line is also connected to the other of a fax machine or modem, on the one hand, or a data modem, on the other hand.

6 Claims, 3 Drawing Sheets

ADAPTIVE DIALING SYSTEM AND METHOD

This application claims the benefit of Provisional application Ser. No. 60/134,641, filed May 18, 1999.

INCORPORATION BY REFERENCE

U.S. patent appn. Ser. No. 09/216,101, filed Dec. 19, 1998, in the names of Simson L. Garfinkel, et al., and entitled "System And Method For Scan-Dialing Telephone Numbers And Classifying Equipment Connected To Telephone Lines Associated Therewith."

FIELD OF THE INVENTION

The invention is generally related to the field of automatic telephone dialing and more particularly to computerized systems and methods system and method for facilitating determination by a calling device as to whether a called device connected to a telephone line is a fax device, non-fax data device or voice telephone, or combination thereof.

BACKGROUND OF THE INVENTION

Scan-dialing of telephone numbers can be important in a number of environments for a number of purposes. For example, an organization may wish to determine, for each of the telephone numbers which it controls, the type or types of equipment, if any, that are connected to the telephone numbers which are associated with the lines. Numerous types of equipment may be connected to a telephone line, such as a voice telephone, an automatic voice answering system (such as an answering machine or a voice mail system), a fax machine, a data modem, and the like. In addition, several types of equipment may be connected to a single telephone line; for example, one line may be shared between a fax machine and a data modem through a switch that directs a call to one or the other based on information, such as tones or tone sequences, that are received from the caller. An organization may wish scan-dial and automatically detect types of equipment connected to telephone numbers which it maintains, for example, instead of trying to inventory the equipment manually, since equipment can be easily connected, disconnected and reconnected to other lines, which would render the inventory out of date. In addition, an organization may wish to scan-dial telephone numbers which it maintains in order to determine whether any of the telephone lines accessible using the respective are connected to equipment which is not authorized by the company or which is not secure pursuant to company policy. In addition, for computers which are connected to the telephone lines which an organization maintains, the organization may wish to ensure that passwords which may be required to access the computers through their dial-up connections are not such as would be easily guessed by an intruder.

U.S. patent appn. Ser. No. 09/216,101, filed Dec. 19, 1998, in the names of Simson L. Garfinkel, et al., and entitled "System And Method For Scan-Dialing Telephone Numbers And Classifying Equipment Connected To Telephone Lines Associated Therewith" (hereinafter, the Garfinkel application) describes a system and method for scan-dialing telephone numbers and classifying equipment connected to telephone lines associated therewith as being connected to one or more of a plurality of types of equipment, including, for example, a telephone set for voice communications, a fax machine or a fax modem for transmitting and/or receiving digital data defining facsimile images, and/or a data modem for transmitting and/or receiving other forms of digital data. It will be appreciated that a telephone line can be classified in a plurality of these classifications. For example, a telephone line can be connected to a modem that can function both to transmit and receive digital data defining facsimile images as well as other types of digital data. In the following, digital data defining facsimile images will be generally referred to as "fax data," whereas other types of digital data will generally be referred to as "data."

An "adaptive answering" technique is often used by a modem connected to a computer or other device that receives a call to determine which of a plurality of types of calls it is to enable it to transfer the dat to a fax program or a non-fax data communication program. That is, a modem will use an adaptive answering technique to determine whether a received call is a fax call, in which the data to be transmitted during the call is fax data to be handled by a fax program, or a data call, in which the data to be transmitted is non-fax data to be handled by a non-fax data communications program. Typically, when a fax machine or modem initiates a fax call, after it dials the call it will immediately begin transmitting a characteristic tone, and the answering modem can determine whether a call is a fax call if, when it answers the call, it receives the tone, and thereafter provide the received data to the fax program. On the other hand, if the answering modem does not receive the tone, it can determine that the call is a non-fax data call and transfer received data to the data communications program, and, in addition, transfer data that it might receive from the communications program to the other device over the same telephone line.

Adaptive answering provides for effective call discrimination by a called device as between a fax call and a non-fax data call. However, a scan dialing system such as that described in the Garfinkel application, as a calling device, needs to be able to determine whether the called device is a fax device, non-fax data device or voice telephone, or combination thereof, in connection with an adaptive dialing, or call origination, methodology.

SUMMARY OF THE INVENTION

The invention provides a new and improved system and method for facilitating determination by a calling device as to whether a called device connected to a telephone line is a fax device, non-fax data device or voice telephone, or combination thereof.

In brief summary, in accordance with one aspect of the invention, the invention provides an adaptive dialing method in which a dialer control module controls a modem to place a telephone call to a telephone line and efficiently classify the telephone line, that is, to determine whether a device connected to the telephone line is one or more of a plurality of types of devices, illustratively, a voice telephone, a fax machine or modem, or a data modem. In accordance with the method, the dialer control module can enable the modem to, in one call, determine whether the telephone line is connected to a voice telephone, on the one hand, or a fax machine or modem or a data modem, on the other hand. During the same call if the dialer control module does not determine that the telephone line is connected to a voice telephone, or during a subsequent call if the dialer control module determines that the telephone line is connected to a voice telephone, the dialer control module determines whether the telephone line is also connected to one of a fax machine or modem, on the one hand, or a data modem, on the other hand by enabling the modem to transmit an appropriate tone thereto and determining whether a connection is completed in response. The dialer control module can repeated the last operation using the appropriate tone to determine whether the telephone line is also connected to the other of a fax machine or modem, on the one hand, or a data modem, on the other hand

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
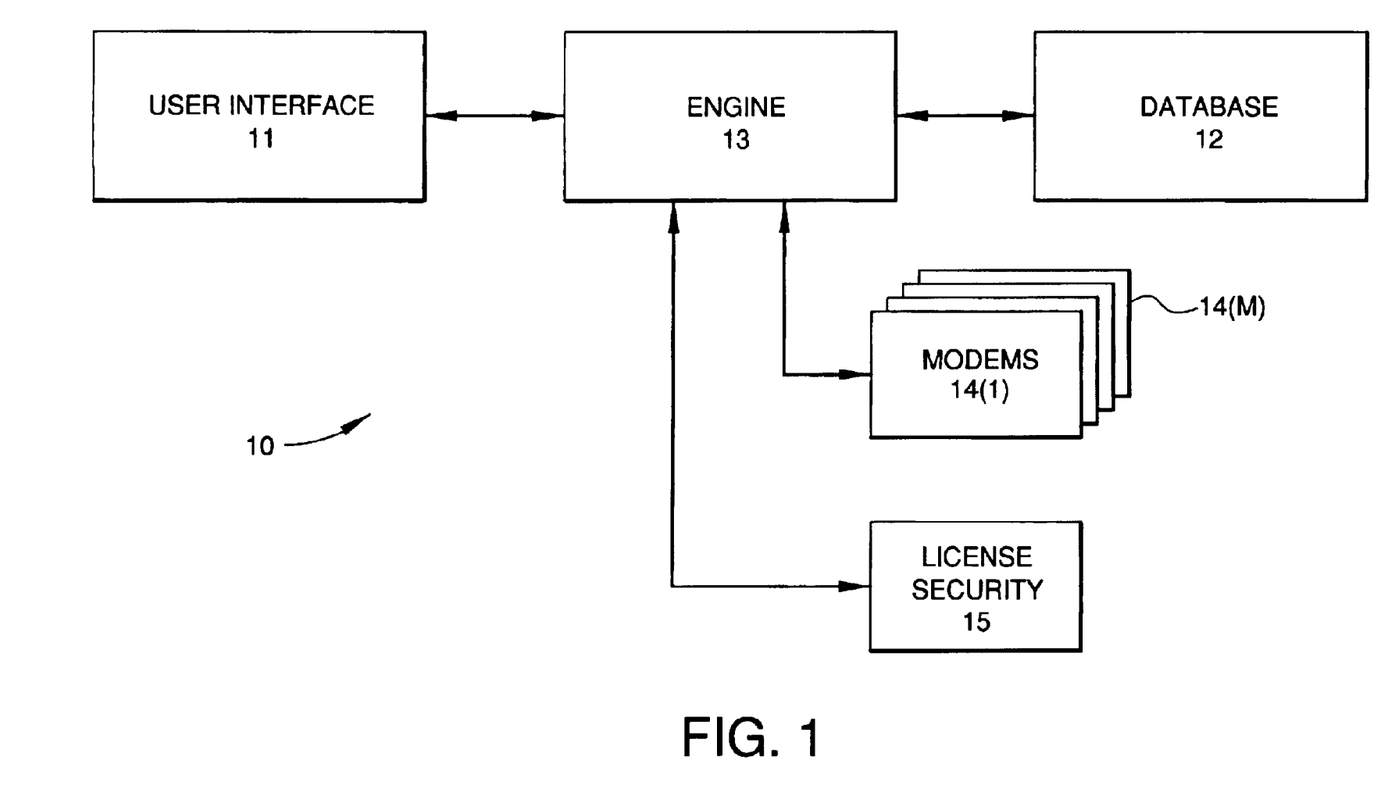
FIG. 1 is a general block diagram of an automatic telephone dialing and classification system that operates in accordance with an adaptive dialing methodology in accordance with the invention.

FIG. 1 is a general block diagram of an automatic telephone dialing and classification system 10 that operates in accordance with an adaptive dialing methodology in accordance with the invention. With reference to FIG. 1, system 10 includes a user interface 11, a database 12, one or more modems 14(1) through 14(M) (generally identified by reference numeral 14(m)) all controlled by an engine 13. Generally, the components depicted in FIG. 1 may comprise elements of a suitably programmed computer (not separately shown), such as a personal computer or computer workstation, with the user interface 11 including a video display device and the database 12 and engine 13 including processing and storage components provided in the computer. In such an embodiment, the engine 13 can receive commands to control operations thereby from an operator over operator input devices, such as a keyboard, mouse or the like (not separately shown) portion of the user interface 11, and can display results, as will be described below, on a video display device (also not separately shown) of the user interface 11. In one embodiment, the information displayed to the operator on the user interface 11 is displayed in the form of a window on a conventional graphical display, but it will be appreciated that any type of display, including, for example, a conventional text-based display.

It will be appreciated that, in such an embodiment (that is, in an embodiment in which the system 10 includes a suitably-programmed computer such as a personal computer or computer workstation), the modems 14(m) may be connected into the system 10 as expansion cards or the like. Any convenient number of modems 14(m) maybe connected into the system 10, each modem 14(m) being capable of being connected to a respective analog telephone line. It will be appreciated that, instead or in addition to modems 14(m) the system 10 may include adapters for connection to digital telephone lines such as those for ISDN ("integrated services digital network"), DSL ("digital subscriber line") or the like. Generally, in the following, it will be assumed that "modem" generally includes all types of devices for connection to any form of telephone line, including analog telephone lines and digital telephone lines.

In addition, in one embodiment the system 10 includes a license security device 15, in the form of a "dongle" connected to, for example, a parallel port (not separately shown) of the computer to provide hardware licensing security for the program controlling the computer included in the system 10. In one embodiment, in which at least a portion of the system 10 is in the form of a programmed computer, with a portion of the computer program being encrypted. The license security device 15 contains a decryption key which is used to decrypt the encrypted portion when the program is booted, and the portion of the computer program that is encrypted is selected to ensure that the system 10 will not operate without the license security device 15 attached. The system 10 may also include other devices, such as a printer to provide hardcopy output, which are conventionally in or used in connection with a computer.

The system 10 provides an arrangement for dialing of telephone numbers to classify the type or types of equipment that are connected to the respective telephone line. In that connection, the operator can provide a telephone number or a range of telephone number, and the system 10 will dial the numbers, and, for each number dialed, determine the types of equipment connected to telephone line associated with the number, including, for example, whether the equipment is a voice telephone, an automatic voice answering system such as an answering machine or voice mail system, a fax machine and/or a modem connected to a computer. The system 10 can determine whether the equipment connected to a dialed line is a voice telephone by determining whether a person answers and speaks into the telephone. In addition, the system 10 can determine whether the equipment connected to a dialed line is a fax machine or computer by monitoring the line for the conventional fax and data modem tones. In the following, "data" will generally be used to refer to data other than that for fax communications. Furthermore, since a telephone line can be shared among several types of devices, either directly or a switching arrangement, the system 10 can force a response from a particular type device by sending, for example, a fax tone to determine whether a fax machine is connected to the dialed line, and, perhaps in a separate call, a data modem tone to determine whether a modem is connected thereto which responds to a data call.

During dialing, the system 10 allows certain numbers or ranges of numbers within the range to be excluded from dialing, or that certain numbers or ranges be dialed only during certain time periods, such as during hours which are defined as business hours, evening hours, early morning hours or the like. In addition, the system 10 allows that telephone numbers be dialed sequentially, at random, or with certain dialing priorities. Furthermore, the system 10 allows that, after the system determines that one of a predetermined set of types of equipment are connected to a line, that it (that is, the system 10) can attempt to identify predetermined characteristics concerning the equipment. For example, if the system 10 determines that the equipment connected to a dialed line is a fax machine, it can determine the fax machines' transmit and receive characteristics, including, for example, the transmit/receive speeds, fax group standards it conforms to, and the like. On the other hand, if the system 10 determines that the equipment connected to a dialed line is a modem connected to a computer, it can attempt to determine the type of operating system controlling the computer and communication protocol used thereby. In addition, the system 10 can attempt to log onto the computer and, if necessary, determine one or more passwords which must be used to give entry to the computer.

The operator enables the information used by the system in controlling the above-described operations to be stored in the database 12. In addition, all of the information determined by the system 10 during its operations as described above is stored in the database 12 for later generation of reports for use by the operator.

Figure 2:
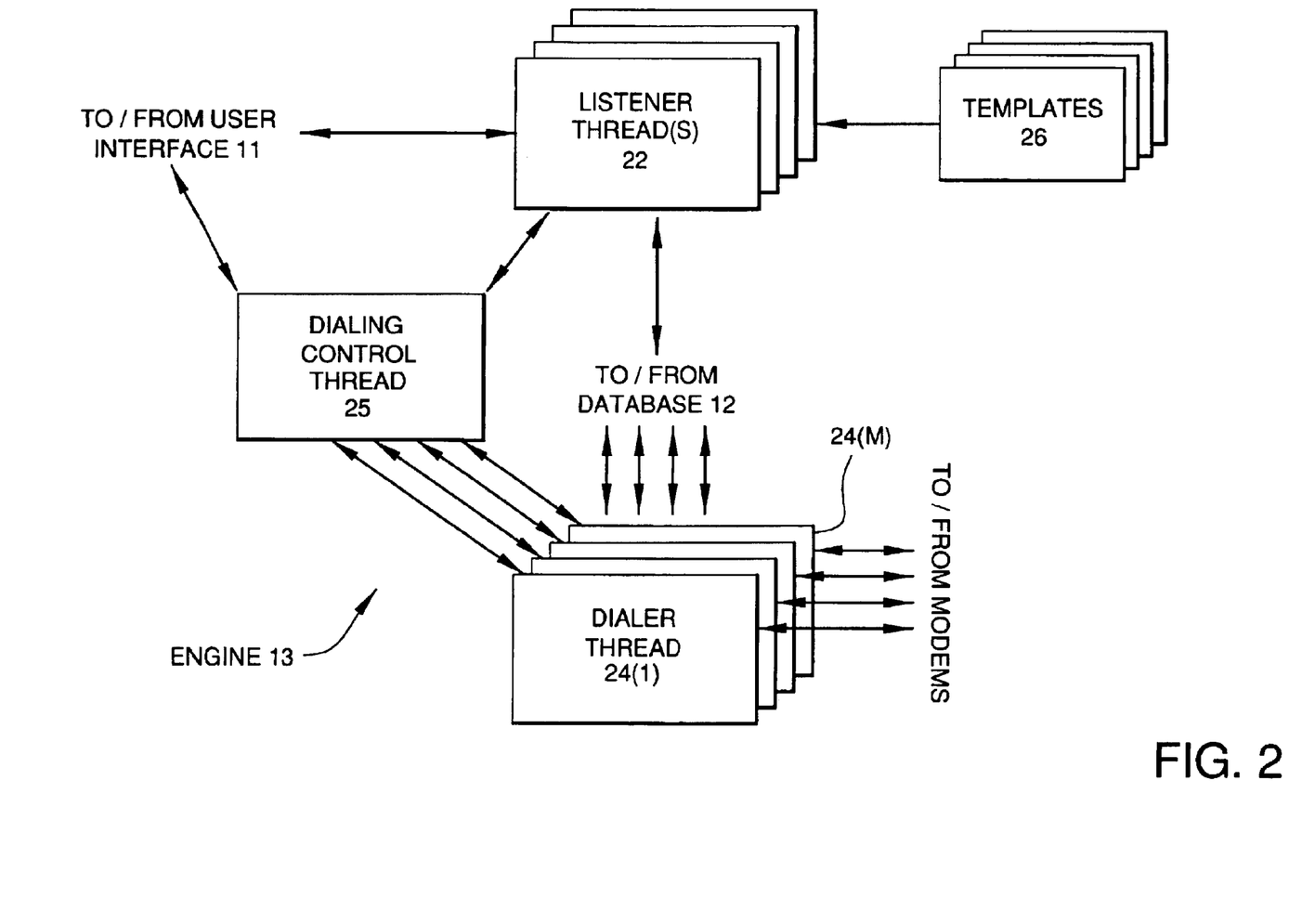
FIG. 2 is a functional block diagram of the system depicted in FIG. 1.

FIG. 2 depicts a functional block diagram of the engine 13 described above in connection with FIG. 1. With reference to FIG. 2, engine 13 includes a plurality of threads, including one or more listener threads 22, one or more dialer threads 24(1) through 24(M) (generally identified by reference numeral 24(m)), and a dialing control thread 25. The user interface thread 20 controls the user interface 11 (FIG. 1), including both user interface devices, such as a video display device, printer and the like, which display or otherwise provide information to the operator, as well as user interface devices, such as a keyboard, mouse and the like which an operator uses to provide information to the system 10. In particular, in connection with the video display device or printer, user interface thread 20 provides information to the user interface 11 for display to the operator, including processing information and reports as will be described below. In addition, the user interface thread 20 receives from the user interface 11 information provided by operator. Illustrative information which an operator may provide includes, for example, telephone number information comprising the identifications of the telephone numbers which are to be dialed. The telephone number information which may be provided, for example, as individual telephone numbers, one or more ranges of telephone numbers, and ranges with exclusions (that is, telephone numbers within a range which are not to be called). In addition, an operator can provide dialing order control information to control the order in which the telephone numbers are to be dialed, indicating, for example, whether the telephone numbers are to be dialed sequentially or at random and whether the telephone numbers are to be dialed once or more than once. In addition, the operator can provide dialing timing control information to control the timing with which the telephone numbers are to be dialed, that is, for example, the maximum number of calls per predetermined time period. Furthermore, the operator can provide operational mode information to control operations performed after a call is answered, and user name and password information to be used as described below. Using the user interface thread 11, the operator can also enable the other threads to be started. A set of the various types of information as described above will be referred to as a "profile." The operator can enable multiple profiles to be created and stored as databases in the database 12.

Generally, each listener thread 22 executes various commands entered by the operator through the user interface 11. In one embodiment, there are several types of commands that are executed by the listener thread 22, including, for example, control commands, profile maintenance commands and status and report generation commands. In response to control commands, the listener thread 22 starts and shuts down the dialing control thread 25. In one embodiment, the listener thread 22 can start multiple dialing control threads 25. If the listener thread 22 does start multiple dialing control threads, they may all be associated with and control overlapping or non-overlapping groups of the dialer threads 24(m).

In response to profile maintenance commands, the listener thread 22 enables profiles to be a created and stored in the database 12, and enables previously-created profiles to be retrieved from the database 12 for display to the operator. After a previously-created profile has been displayed, the operator can verify the profile and, if necessary, update it, using the user interface 11, after which the updated profile can be stored in the database 12. In addition, profile maintenance commands executed by the listener thread 22 can enable a profile to be deleted from the database 12.

In response to status and report generation commands, the listener thread 22, through the user interface 11, provides information to the operator as to the status of the various elements of the system 10, including for example, the status of the dialing control thread 25 in its operations in connection with processing of a profile, operational status of the individual dialer threads 24(m) and modems 14(m), and so forth. In addition, generally after a dialing control thread 25 has processed a profile, the listener thread 22, using pre-defined report templates 26, can generate reports in various formats of results of processing of the profile, for display or printing. Each report template includes pre-defined textual material and variables for which the listener thread 22 can substitute specific items of information concerning results of calls from processing of a profile. After generating a report, the listener thread 22 can provide the report to the user interface thread 20 for display or printing. In one embodiment, templates 26 are provided in HTML (HyperText Markup Language) and RTF (Rich Text Format) formats, but it will be appreciated that templates may be provided in any format.

The dialing control thread 25, after being started by the user interface thread 20, determines from the dialing and timing control information in the database 12, the next telephone number to be dialed and when it is to be dialed. At the time the next telephone number is to be dialed, the dialing control thread 25 determines whether a dialer thread 24(m) is free, and, if so, selects that dialer thread 24(m) to perform the call. On the other hand, if no dialer thread 24(m) is free at the time the next telephone number is called, the dialing control thread 25 will wait until a dialer thread 24(m) becomes free, at which point it will select the free dialer thread 24(m) to perform the call. In response to being selected, the dialer thread will dial the telephone number and perform predetermined operations in connection therewith.

As noted above, each dialer thread 24(m) controls the correspondingly-indexed modem 14(m). In those operations, each dialer thread 24(m), after receiving a telephone number information from the dialing control thread 25, retrieves the operational mode information to be used in connection with the telephone number. After receiving the operational mode information, the dialer thread 24(m) enables the modem 14(m) to dial the telephone number provided and thereafter performs operations as determined by the operational mode information. In one embodiment, the dialer thread 24 can operate in three operational modes, namely, a "connect" mode, an "identify" mode and a "penetrate" mode. In the connect mode, the dialer thread 24(m) enables the modem 14(m) to dial a telephone number and determine whether a telephone line is assigned to the telephone number. If the dialer thread 24(m) determines that a telephone line is assigned to the telephone number, it (that is, the dialer thread 24(m)) can enable an indication therefor in the database 12. The dialer thread 24(m) determines that a telephone line is assigned to the telephone number by enabling the modem 14(m) to determine the manner in which the call is answered. That is, if the dialed telephone number is "not in service," that is, if no telephone line is assigned to the dialed telephone number, a recorded notification is typically provided by the telephone company, which the dialer thread 24(m) can receive from the modem 14(m) and enable to be stored in the database 12. If the dialed telephone number is in service, that is, if a telephone line is assigned to the dialed telephone number, the dialer thread 24(m) can enable an indication therefor to be stored in the database 12, and in addition can store an indication as to whether the call was answered within, for example, a selected number of rings or a predetermined maximum time interval after dialing. If the call is not answered within the selected number of rings or predetermined maximum time interval, which can occur if, for example, the telephone line is connected to a voice telephone which is not answered, the dialing control thread 25 may enable the telephone number to be dialed again at one or more a later times, as will be described below, until the call is answered, to verify that the telephone line is currently in service and being used. The dialing control thread 25 may enable the telephone number to be dialed up to a predetermined maximum number of unanswered calls have been placed using the telephone number, which may, but need not, indicate that nothing is connected to the line.

In the identify mode, a dialer thread 24(m) enables the associated modem 14(m) to dial and, if the equipment connected to the line associated with the telephone number answers in response to the call, determine the type of equipment, illustratively whether the equipment is a voice telephone, automated voice answering device such as an answering machine or voice mail system, a fax machine or modem, and thereafter hang up. If the equipment is a voice telephone, the dialer thread 24 can also record the oral response, if any, by the person who answers the phone, for storage in the database 12. If the dialer thread 24(m) determines that equipment connected to the called line includes an automated voice answering device, it can, using voice recognition or comparison to known samples, determine the prompts responses for which are required to gain entry to the automated voice answering device and check default or common passwords in response to attempt to gain entry. If the dialer thread 24(m) gains entry to an automated voice answering device it can attempt to determine characteristics of the device, such as the maximum length of messages that may be left and also the capacity of the device, that is, the amount of message recording time provide by the device or number of messages that may be left on the device.

Further in the identify mode, the dialer thread 24(m) can determine whether the equipment connected to the telephone line is a fax machine or a modem set to receive a data call in relation to the characteristic tones emitted thereby. The dialer thread 24(m) can determine whether the dialed telephone number is not in service in the same manner as described above, and enable the recorded notification provided by the telephone company to be stored in the database 12 along with the telephone number that was called.

Operations performed by a dialer thread 24(m) in the penetrate mode include those described above in connection with the connect and identify modes, and in addition, if the equipment connected to the called telephone line is a modem set to receive a data call, attempts to penetrate the computer connected thereto. In those operations, the dialer thread 24(m) attempts to identify the operating system that is controlling the computer and the communications protocol used thereby by identifying various characteristics of the bit stream that is transmitted by the computer and received by the modem 14(m). In addition, the dialer thread 24(m) attempts to actually penetrate the computer by enabling the associated modem 14(m) to provide various combinations of user names and passwords. If the dialer thread 24(m) is able to penetrate the computer using a particular user name and password combination, it will also enable that information (that is, the user name/password combination) to be stored in the database 12 along with the telephone number that was called. The user names and passwords that the dialer thread 24(m) will use in the penetrate mode are provided by the operator and stored in the database 12. In addition, the operator can, by storing appropriate information in the database 12, control the number of user name/password combinations that will be used by the dialer thread 24(m) during a call, since typically a computer will enable its modem to terminate a call after receiving a predetermined number of invalid user name/password combinations. As will be described below in greater detail, the dialer control thread 25 can control the user name/password combinations used by the various dialer threads 24(m) in various modes. Illustratively, the control thread 25 can enable all of the dialer threads 24(m) to try all of the user name/password combinations or selected ones or ranges of user name/password combinations, in random order, in an order based on the order in which the telephone numbers are sorted, or other order that will be apparent to those skilled in the art.

As noted above, in both the identify and penetrate modes, if a call is answered, the dialer thread 24(m) determines whether the called telephone line is connected to a voice telephone or automated voice answering device, a fax machine or modem or a data modem using an adaptive dialing, or call origination, methodology in accordance with the invention. In that operation, the dialer thread 24(m) makes use of data that it receives from the modem 14(m) to which it is connected, and, based on the received data, transmits data to the modem 14(m) to enable the modem 14(m) to transmit predetermined information over the called telephone line to be received by equipment connected thereto. Based on the data that it receives from the modem 14(m), the dialer thread 24(m) can determine the type of equipment the called telephone line is connected to. Generally, the dialer thread 24(m) can classify a telephone line in two calls. In a first call, the dialer thread 24(m) can classify the telephone line as being connected to a voice telephone, on the one hand, or a fax machine or modem or a data modem, on the other. In the second call, the dialer thread 24(m) can classify the telephone line as being connected to a fax machine or modem, on the one hand, or a data modem, on the other. It will be appreciated that, since a telephone line can be connected to a device, such as a modem, which functions both as a fax modem and as a data modem, the dialer thread 24(m) can, after it classifies the telephone line as being connected to one,of a fax machine or modem or a data modem, initiate another call or set of calls to determine whether, the line is also connected to the other of a fax machine or modem or a data modem.

In one embodiment, in which modems 14(m) include integrated circuits produced by Rockwell Semiconductor Systems which support adaptive call dialing, the dialer thread 24(m) provides commands to the modem 14(m) and the modem 14(m) in response provides information to the dialer thread 14(m). In one embodiment, the commands are from the well-known "Hayes modem" AT command set. In response to a command, the modem 14(m) will provide either an "OK" indication, indicating that it has executed the command, or an "ERROR" indication, indicating that the command has not been executed. The modem 14(m) can provide the ERROR indication if the command is improperly executed and if it is unable to execute the command. In addition, the modem 14(m) can provide the a number of <DLE> characters (control-P or \20), including:

| Character | Information Represented by the Character |
|---|---|
| VCON | A connection has been established |
| <DLE>a | Answer tone received, may be from both fax machines or modems and data modems |
| <DLE>b | Busy tone received |
| <DLE>c | Calling tone from a fax machine or modem received |
| <DLE>d | Dial tone received |
| <DLE>e | European data modem calling tone received |
| <DLE>f | Bell 2225 Hz answer tone (sent by 1200 baud modems and by higher speed modems when they try to utilize older fax protocols) received |
| <DLE>h | On hook |
| <DLE>o | Buffer overrun, sent by modem operating in voice mode if a receive buffer overruns |
| <DLE>q | Quiet—a silence timer has expired when modem is operating in voice mode |
| <DLE>s | Silence |
| <DLE>t | Off-hook |
| <DLE>u | Under-run |
| <DLE>T | Timing mark, sent every second when operating in some modes |
| <DLE><EXT> | End of stream |

Generally, during a call if the modem provides the VCON character, indicating that a connection had been made to a device connected to the called telephone line, and no other character that might indicate a fax machine or modem or data modem, the dialer thread 24(m) determines that the called telephone line is connected to a voice telephone.

For use in controlling calls made to a telephone line in adaptive dialing mode, the dialer thread 24(m) makes use of several flags and variables, including a VCON flag, a VCON timer, a "counta" counter, a "countf" counter, an "rticks" counter and "tocarrier" and "tofax" flags. The dialer thread 24(m) sets the VCON flag when a VCON character is received from the modem 14(m). The dialer thread starts the VCON timer when the VCON character is received and, if no other character is received from the modem 14(m) before the timer times out, the dialer thread can perform predetermined operations, which may include terminating the call. The dialer thread uses the "counta" AND "countf" counters to keep track of the number of respective <DLE>a and <DLE>f characters have been received from the modem 14(m) for the telephone line during a call or set of calls made to the telephone line during a classification session in connection therewith. The dialer thread 24(m) uses the "rticks" counter to keep track of the total number of adaptive responses that have been received from the modem 14(m) for the telephone line during a call or set of calls made to the telephone line during a classification session in connection therewith. The dialer thread 24(m) uses the tocarrier and tofax flags to determine whether to attempt to initiate a fax or non-fax data connection over the telephone line. Generally, initially both the tocarrier flag and the tofax flag will be set, and that will enable the dialer thread to initiate a non-fax data connection first.

Figure 3:
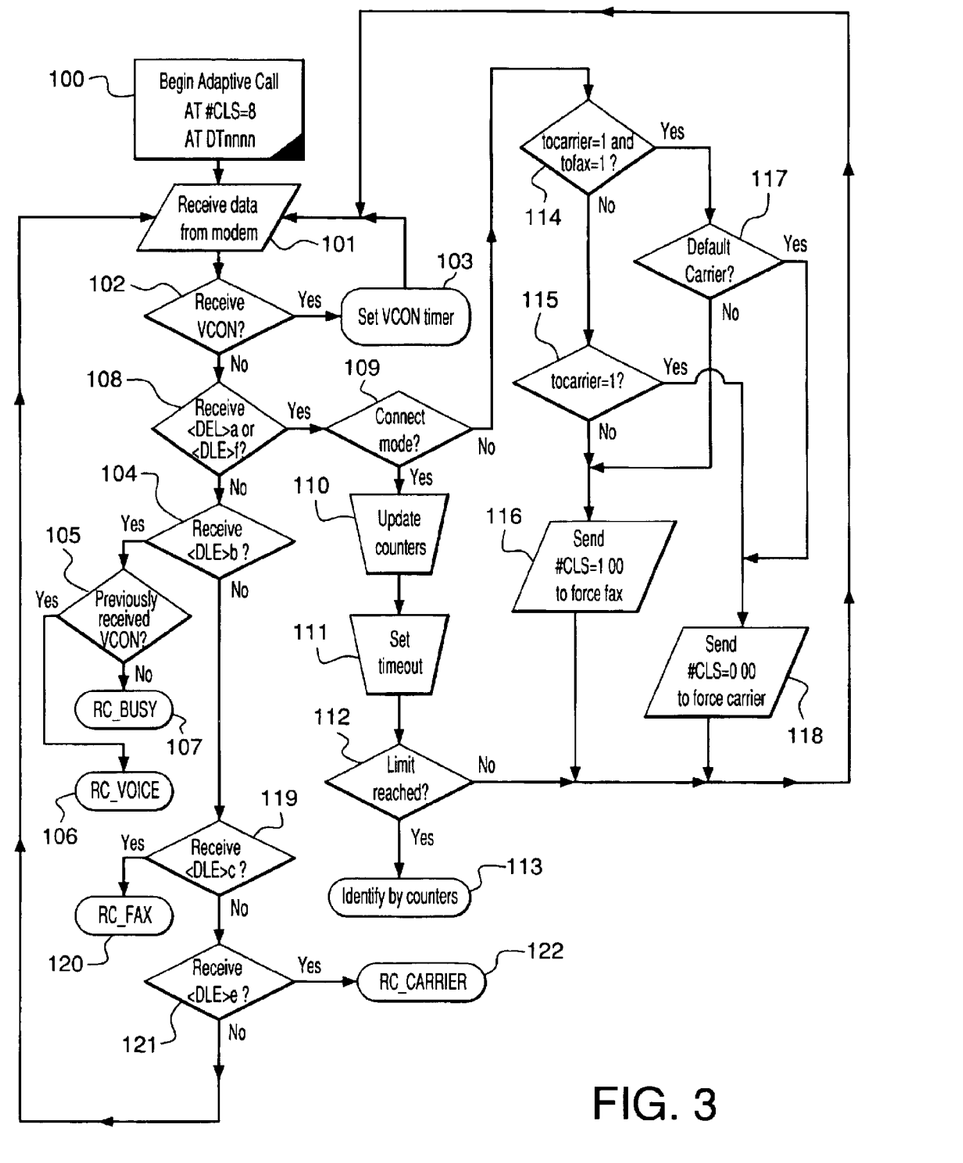
FIG. 3 is a flow chart depicting operations performed by one embodiment of the system depicted in FIG. 1 in connection with determining whether a called device connected to a telephone line is a fax device, non-fax data device or voice telephone, or combination thereof.

With this background, operations performed by the dialer thread 24(m) in connection with classifying a called telephone line will be described in connection with the flow chart in FIG. 3. With reference to FIG. 3, the dialer thread 24(m) initially places the modem 14(m) in an adaptive call mode and enables the modem 14(m) to dial a telephone number (step 100). In the embodiment in which the modem 14(m) includes one or more of the aforementioned Rockwell modem integrated circuits, the dialer thread places the modem 14(m) in the adaptive call mode by transmitting to it an AT #CLS=8 command. If the modem 14(m) can be placed in adaptive call mode, it will respond with an OK indication; on the other hand, if the modem 14(m) is unable to be placed in adaptive call mode, it will respond with an ERROR indication. If the modem 14(m) responds with the OK indication, the dialer thread 24(m) enables the modem 14(m) to dial a telephone number by transmitting to it an AD DTnnnnn, which enables the modem 14(m) to dial a call using the conventional DTMF (dual tone multi-frequency) dialing technique. If the modem 14(m) successfully dials the call, it will respond with an OK indication; on the other hand, if the modem 14(m) is unable to successfully dial the call, it will respond with an ERROR indication.

If the modem 14(m) responds with an "OK," the dialer thread 24(m) sequences to step 101, in which it waits to receive a character from the modem 14(m). When the modem 14(m) provides a character to the dialer thread 24(m), the dialer thread 24(m) will determine what the character is. If the modem 14(m) determines that the character is a VCON character, indicating that a connection has been made (step 102), it will sequence to step 103 to start the VCON timer. Thereafter, the dialer thread 24(m) returns to step 101 to wait for another character.

If the dialer thread receives another character from the modem 14(m) before the VCON timer times out, it will reset the VCON timer and determine what the character is. If the dialer thread 24(m) determines that the character is a <DLE>b character (step 104), it will sequence to step 105 in which it determines whether a VCON character had previously been received during the call. The modem 14(m) will provide a <DLE>b character under two circumstances, namely, if the called telephone line is busy (that is, if it receives a busy tone) or if the call is to a voice telephone and the telephone goes off-hood and then on-hook. In the first (that is, if the telephone line is busy), the <DLE>b character will be provided after the number is dialed (reference step 100) without an intervening VCON character, the called telephone line will indeed be busy. On the other hand, in the second (that is, if the call is to a voice telephone and the telephone goes off-hood and then on-hook), the <DLE>b character will be provided after the VCON character. Accordingly, if the dialer thread 24(m) determines in step 104 that the character received from the modem is a <DLE>b character, it will sequence to step 105 to determine whether a VCON character had previously been received. If the dialer thread 24(m) makes a positive determination in step 105, it will classify the called telephone line as being connected to a voice telephone (step 106). On the other hand, if the dialer thread 24(m) makes a negative determination in step 105, it will classify the called telephone line as busy (step 107). The dialer thread 24(m) may enable the classifications to be entered into database 12 (FIG. 2) as described in the aforementioned Garfinkel application. Operations performed by the system 10 if the telephone line is busy are described in the aforementioned Garfinkel application.

Returning to step 101, if the dialer thread 24(m) receives a character, and if it determines in step 108 that the character is a <DLE>a character or a <DLE>f character, indicating that an answer tone was received, which indicates that the telephone line is connected to a fax machine or modem and/or a data modem, if the call is in a mode other than the connect mode, it (that is, the dialer thread) will enable the modem to transmit either a fax tone or a data communications tone to force a fax or non-fax data connection. If, after transmitting a fax or data communications tone, the device connected to the called telephone line responds with a respective fax or data communications tone, and the modem 14(m) provides a connect indication, the dialer thread 24(m) can classify the telephone line as being connected to a fax machine or modem or a data communications modem.

In that case, the dialer thread 24(m) resets the VCON timer and increments the "rticks" counter and the respective "counta" or "countf" counter and thereafter determines whether the telephone call is being performed in connect mode (step 109), in which the dialer thread 24(m) is to just determine whether the called telephone number is associated with a telephone line that is, in turn, connected to a fax machine or modem or a data modem. Accordingly, if the dialer thread 24(m) makes a positive determination in step 109, it will update the counters for the line as described in the aforementioned Garfinkel application (step 110), set a time-out counter (step 111) and determine whether the value provided by the counters corresponds to a predetermined limit (step 112). If the dialer thread 24(m) makes a positive determination in step 112, it will use the counters to classify the telephone line (step 113). On the other hand, if the dialer thread 24(m) makes a negative determination in step 112, it will return to step 101.

Returning to step 109, if the dialer thread determines that the telephone call is not in connect mode, it will sequence to step 114, in which it will determine the conditions of the "tocarrier" and "tofax" flags. If the "tofax" flag is clear (that is, has the value "0" and the "tocarrier" flag is set, the dialer thread 24(m) will enable the transmit the data communications tone. On the other hand, if both the "tofax" and "tocarrier" flags are set, the dialer thread 24(m) will enable one of them, as determined by the condition of a "default" tone variable, to be transmitted. Finally, if the "tocarrier" flag is clear, the dialer thread 24(m) will enable the fax tone to be transmitted. Accordingly, in step 114 the dialer thread 24(m) determines whether both the "tocarrier" flag and the "tofax" flag are set. If the dialer thread 24(m) determines that one or both of the "tocarrier" and/or "tofax" flags are not set, it will sequence to step 115, in which it determines whether the "tocarrier" flag is set. If the dialer thread 24(m) makes a negative determination in step 115, it provides an AT #CLS=1 O0 command to the modem 14(m) to enable it to transmit a fax tone over the telephone line (step 116). Thereafter, the dialer thread 24(m) can reset the tofax flag and return to step 101.

Returning to step 115, if the dialer thread 24(m) determines in that step that the "tocarrier" flag is set, it will provide an AT #CLS=0 O0 command to the modem 14(m) to enable it to transmit a data communications tone over the telephone line (step 118). Thereafter, the dialer thread 24(m) can reset the "tocarrier" flag and return to step 101. It will be appreciated that, if the dialer thread 24(m) in a subsequent call receives the <DLE>a or <DLE>f, either during the same call or in a subsequent call during the classification session and sequences through steps 114 and 115, it will proceed to step 116 to enable the dialer thread 24(m) to, in turn, enable the fax tone to be transmitted.

Returning to step 114, if the dialer thread makes a positive determination in that step, that is, if it determines that both the "tocarrier" flag and the "tofax" flag are set, it will sequence to step 117, in which it will determine the condition of the "default" tone flag. If the dialer thread 24(m) determines that the "default" tone flag indicates that the fax tone is to be transmitted, the dialer thread 24(m) will sequence to step 116. On the other hand, if the dialer thread 24(m) determines that the "default" tone flag indicates that the data communications tone is to be transmitted, the dialer thread 24(m) will sequence to step 118.

Returning to step 101, if the dialer thread 24(m) receives a character from the modem 14(m), and if it determines in step 119 that the character is a <DLE>c character, indicating that the device connected to the called telephone line is transmitting a fax tone, the dialer thread 24(m) will classify the telephone line as being connected to a fax machine or modem (step 120).

Returning to step 101, if the dialer thread 24(m) receives a character from the modem 14(m), and if it determines in step 121 that the character is a <DLE>e character, indicating that the device connected to the called telephone line is transmitting a European data mode calling tone, the dialer the telephone line as being connected to a fax machine or modem (step 120).

Returning to step 101, if the dialer thread 24(m) receives a character form the modem 14(m), and if it determines in step 121 that the character is a <DLE>e character, indicating that the device connected to the called telephone line is transmitting a European data mode calling tone, the dialer thread 24(m) will classify the telephone line as being connected to a data modem (step 122).

When the dialer thread 24(m) has established a classification for the telephone line in step 106, 107, 113, 120, or 122, it can enable the modem 14(m) to hang up. In that operation, the dialer thread 24(m) will transmit an AT H0 command to the modem 14(m) to enable it to hang up, and an AT #CLS=0 command to condition the modem 14(m) to its conventional non-adaptive dialing mode.

The invention provides a number of advantages. In particular, the invention provides an adaptive dialing methodology that facilitates efficient classification of a called telephone line by the dialer thread 24(m).

It will be appreciated that the invention may be useful in connection with modems 14(m) other than those which include integrated circuits produced by Rockwell Semiconductor Systems.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method of controlling a modem to place a telephone call to a telephone line and efficiently classify the telephone line as being connected to one or more of a voice telephone, a fax machine or modem, or a data modem, the method comprising the steps of     A. enabling the modem to, in one call, determine whether the telephone line is connected to a voice telephone, on the one hand, or a fax machine or modem or a data modem, on the other hand,     B. during the same call if it is not determined that the telephone line is connected to a voice telephone, or during a subsequent call if it is determined that the telephone line is connected to a voice telephone, determining whether the telephone line is also connected to one of a fax machine or modem, on the one hand, or a data modem, on the other hand by enabling the modem to transmit an appropriate tone thereto and determining whether a connection is completed in response.

2. A method as defined in claim 1 in further comprising the step of, during a subseqeunt call, determining whether the telephone line is also connected to the other of a fax machine or modem, on the one hand, or a data modem, on the other hand by enabling the modem to transmit an appropriate tone thereto and determining whether a connection is completed in response.

3. A dialer control module for controlling a modem to place a telephone call to a telephone line and efficiently classify the telephone line as being connected to one or more of a voice telephone, a fax machine or modem, or a data modem, the dialer control module comprising:

A. a voice classification module configured to enable the modem to, in one call, determine whether the telephone line is connected to a voice telephone, on the one hand, or a fax machine or modem or a data modem, on the other hand,     B. a fax/data control module configured to, during the same call if it is not determined that the telephone line is connected to a voice telephone, or during a subsequent call if it is determined that the telephone line is connected to a voice telephone, determine whether the telephone line is also connected to one of a fax machine or modem, on the one hand, or a data modem, on the other hand, by enabling the modem to transmit an appropriate tone thereto and determining whether a connection is completed in response.

4. A dialer control module as defined in claim 3 in further comprising a data/fax control module configured to, during a subseqeunt call, determine whether the telephone line is also connected to the other of a fax machine or modem, on the one hand, or a data modem, on the other hand by enabling the modem to transmit an appropriate tone thereto and determining whether a connection is completed in response.

5. A computer program product for use in connection with a computer to provide a dialer control module for controlling a modem to place a telephone call to a telephone line and efficiently classify the telephone line as being connected to one or more of a voice telephone, a fax machine or modem, or a data modem, the computer program product comprising a computer-readable medium having encoded thereon:

A. a voice classification module configured to enable the computer to enable the modem to, in one call, determine whether the telephone line is connected to a voice telephone, on the one hand, or a fax machine or modem or a data modem, on the other hand,     B. a fax/data control module configured to enable the computer to, during the same call if it is not determined that the telephone line is connected to a voice telephone, or during a subsequent call if it is determined that the telephone line is connected to a voice telephone, determine whether the telephone line is also connected to one of a fax machine or modem, on the one hand, or a data modem, on the other hand, by enabling the modem to transmit an appropriate tone thereto and determining whether a connection is completed in response.

6. A computer program product as defined in claim 3 in further comprising a data/fax control module configured to enable the computer to, during a subseqeunt call, determine whether the telephone line is also connected to the other of a fax machine or modem, on the one hand, or a data modem, on the other hand by enabling the modem to transmit an appropriate tone thereto and determining whether a connection is completed in response.

* * * * *